United States Patent Office 2,988,624
Patented June 13, 1961

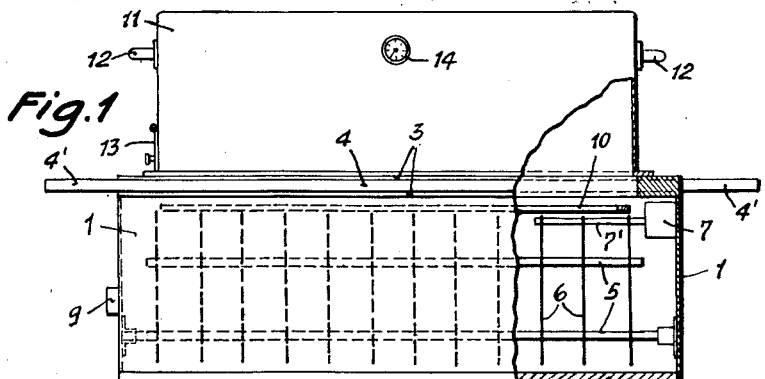
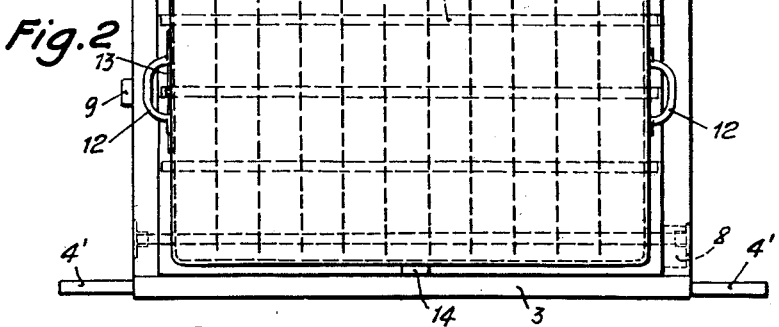
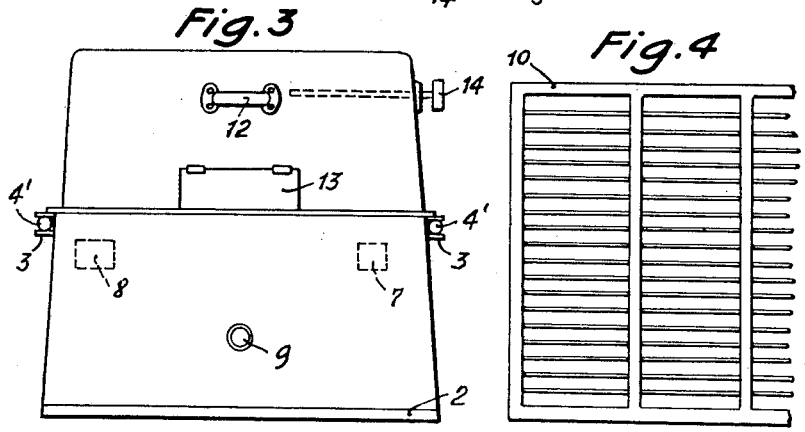
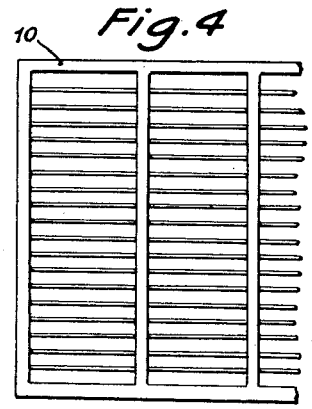

2,988,624
PORTABLE SOIL STERILIZER
Eduard Iseli-Bossardt, Schotz, Lucerne, Switzerland, assignor to Iseli & Co., Schotz, Lucerne, Switzerland, a firm
Filed Aug. 19, 1957, Ser. No. 678,848
1 Claim. (Cl. 219—19)

The sterilization of earth for cultivation in containers by the action of heat is known and has been found to be very effective in a general way. However, it has been found that it is inconvenient to work sterilized earth for cultivation, turf dust, and the like with unsterilized tools, pots, and the like. It is found that earth residues originating from other places which had not been sterilized always adhere to such tools, pots, and the like. Thus, hitherto plant and soil pests succeeded in penetrating unnoticed into the sterilized earth and reducing the efficiency of sterilization, so that it became necessary to repeat the sterilization very frequently.

The object of the present invention is an equipment for the sterilization of gardening materials, such as earth for cultivation, turf dust, and all gardening implements and the like. According to the invention, the equipment has the characteristic feature that the container is provided with a compartment for the loose material and with another compartment, separate from the first compartment, for the sterilization of gardening implements, where both compartments are equipped with a common heating element. The whole equipment is arranged so that either the loose material or the gardening implements can be sterilized by means of the same heater independent of each other in their appropriate compartment.

The drawing shows an embodiment of the object of the invention, where:

FIG. 1 is a side view, partly in section, of the combined equipment,
FIG. 2 is a plan view to FIG. 1, where the grid is not indicated,
FIG. 3 is a front view of the equipment, and
FIG. 4 is a partial plan view of the grid.

The combined equipment shown here has a rectangular container 1 with corrosion-resistant walls and an easily detachable floor 2. The container is conically widened at its lower part, at least when seen from the narrow side, as indicated in FIG. 3. The longitudinal walls are reinforced along their upper edge by means of channel sections 3, to whose flanges projecting tubes 4 are fixed. The ends of tubes 4 serve as handles 4'.

Rod-shaped heating elements 5 are arranged with uniform spacing along the longitudinal direction of the container, in its inside, the rods being connected by means of heat-distributor plates 6, in a direction transverse to the direction of the rods, and providing a heat-conducting connection between the rods. The heating tubes are arranged in two layers, one above the other, and form with the distributor plates 6 a complete heater, which is fixed to the container at its narrow ends at least by supporting the outer heating tubes of the lower layer at these container walls. 7 is a thermostat, whose detector 7' is connected to several heat-distributor plates by means of a heat-conducting connection. The heating current circuit is regulated by the thermostat 7 by means of a contactor 8 within the range of regulation set on the thermostat. 9 is an indicating lamp, which indicates that current is flowing through the heater.

The vertically arranged heat-distributor plates 6 enable the container to be filled easily from the top with the earth and the like to be sterilized. The container is emptied by lifting it.

A grid 10 is employed to support the gardening implements to be sterilized. The grid can be placed in the container, as shown in Fig. 1, so as to rest on the heat-distribution plates 6. A perforated plate can also be employed instead of a grid. A hood 11 which can be placed on the container 1 is employed to close the sterilizing space surrounding the implements to be sterilized. The hood 11 is supported by means of a flange-shaped edge on the container. It is equipped with one handle 12 on each of its narrow sides, and an opening closed by means of a flap 13 on one of the narrow sides, so as to enable also gardening tools with long handles to be sterilized, in which case the long handles project from the container and pass through the opening. 14 is a thermometer which can be read outside on the hood, to determine the sterilizing temperature under the hood. When sterilizing earth for cultivation, turf dust, and the like, the container opening can be covered either with a flat top or with the hood.

The sterilization of the gardening implements is carried out when the container 1 is empty. The implements are placed on the grid 10 which has been inserted into the container, and the hood is placed on the container. The sterilizing temperature which has to be attained for the gardening implements can also be set on the thermostat 7.

The equipment described here can also be employed as a stove for space heating or as a fully automatic bed for rooting and plant propagation.

Instead of the loose bottom, the container 1 could also be provided with a sliding bottom or a bottom flap. When using a bottom flap, it must be possible to lock it by means of a bolt in its closed position.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

A portable soil sterilizer comprising a rectangular box open at its top and a rectangular hood open at its bottom and of substantially the same height as the box adapted for mounting on the open upper end of the box, the box containing an electric heater having longitudinally extending spaced rods and spaced transversely extending plates supported on the rods with the upper edges of the plates terminating in a plane adjacent the upper end of the box, a grid supported on the upper edges of said plates defining a lower compartment in the box for earth to be sterilized and an upper compartment in the hood for implements to be sterilized, channel reinforcements extending longitudinally of the upper sides of the box and tubular rods mounted in said channel members and having ends extending outwardly of the box constituting handles for transporting the box.

References Cited in the file of this patent
UNITED STATES PATENTS

| | | |
|---|---|---|
| 717,587 | Lord | Jan. 6, 1903 |
| 1,688,144 | Heilman | Oct. 16, 1928 |
| 1,988,871 | Kennedy et al. | Jan. 22, 1935 |
| 1,996,708 | Parsons | Apr. 2, 1935 |
| 2,050,254 | Barnsteiner | Aug. 11, 1936 |
| 2,103,709 | Cann | Dec. 28, 1937 |
| 2,230,238 | Duberstein et al. | Feb. 4, 1941 |
| 2,548,363 | Gray | Apr. 10, 1951 |
| 2,784,286 | Dillon | Mar. 5, 1957 |
| 2,806,123 | Steinbock | Sept. 10, 1957 |
| 2,847,545 | Alexander | Aug. 12, 1958 |